(12) United States Patent
Hjelmberg

(10) Patent No.: US 9,005,341 B2
(45) Date of Patent: Apr. 14, 2015

(54) SEALING DEVICE AND METHOD

(75) Inventor: Anders Erik Hjelmberg, Vaxjo (SE)

(73) Assignee: ALSTOM Technology Ltd, Baden (CH)

(*) Notice: Subject to any disclaimer, the term of this patent is extended or adjusted under 35 U.S.C. 154(b) by 0 days.

(21) Appl. No.: 13/822,304

(22) PCT Filed: Sep. 1, 2011

(86) PCT No.: PCT/IB2011/002030
§ 371 (c)(1),
(2), (4) Date: Mar. 12, 2013

(87) PCT Pub. No.: WO2012/035389
PCT Pub. Date: Mar. 22, 2012

(65) Prior Publication Data
US 2013/0167492 A1  Jul. 4, 2013

(30) Foreign Application Priority Data
Sep. 15, 2010 (EP) .................................. 10176781

(51) Int. Cl.
*B01D 46/00* (2006.01)
*F16J 15/52* (2006.01)
(Continued)

(52) U.S. Cl.
CPC .............. *F16J 15/52* (2013.01); *Y10T 29/4984* (2015.01); *B01D 46/4272* (2013.01); *B01D 2271/02* (2013.01); *F16J 15/525* (2013.01); *F16J 15/56* (2013.01)

(58) Field of Classification Search
CPC ........ A47L 9/14; A47L 9/1454; B01D 46/10; B01D 46/521; B01D 46/2411; B01D 46/02
USPC .................. 95/273, 10, 25, 117; 55/361, 490; 74/18.2; 29/434; 96/117.5, 135
See application file for complete search history.

(56) References Cited

U.S. PATENT DOCUMENTS 3,273,854 A * 9/1966 Bryant ........................ 251/228
4,081,222 A   3/1978 Smith et al.
(Continued)

FOREIGN PATENT DOCUMENTS

CN  2735089 Y  10/2005
GB   817272 A   7/1959
(Continued)

OTHER PUBLICATIONS

International Search Report and Written Opinion of the International Searching Authority, PCT Application No. PCT/IB2011/002030, dated Jan. 12, 2012, Authorized Officer Oscar Van Wel.
(Continued)

*Primary Examiner* — Jason M Greene
*Assistant Examiner* — Karla Hawkins

(57) ABSTRACT

The present disclosure relates to a sealing device 20 for a control rod 17, passing through an aperture 15c in a wall 15, wherein the control rod 17 is connected between an actuator 13, placed on one side of the wall, and a controlled entity 9a, placed on the other side of the wall, such that the actuator can control the controlled entity with motion of the control rod. The sealing device 20 includes a packing box 37 through which the control rod 17 passes and a seal 41 which provides a sealing function between the control rod 17 and the packing box 37. The packing box 37 is moveable with the control rod 17 in relation to the wall 15. Wall aperture 15c is sized to allow movement of the control rod 17 within aperture 15c. A flexible member 39 surrounds a portion of control rod 17 and extends between the packing box 37 and the wall 15, in a gastight communication with each. As such, the subject sealing device allows movement of the control rod without compromising the sealing function efficiency thereof.

8 Claims, 3 Drawing Sheets

(51) Int. Cl.
*B01D 46/42* (2006.01)
*F16J 15/56* (2006.01)

(56) References Cited

U.S. PATENT DOCUMENTS 5,197,712 A * 3/1993 Engelhardt ................ 251/335.3
2010/0058722 A1   3/2010 Andersson

FOREIGN PATENT DOCUMENTS

GB    1464733 A    2/1977
JP     473547     11/1990

OTHER PUBLICATIONS

Office action issued from Chinese Patent Office dated Jul. 10, 2014 for CN Application No. 201180044698.1.

* cited by examiner

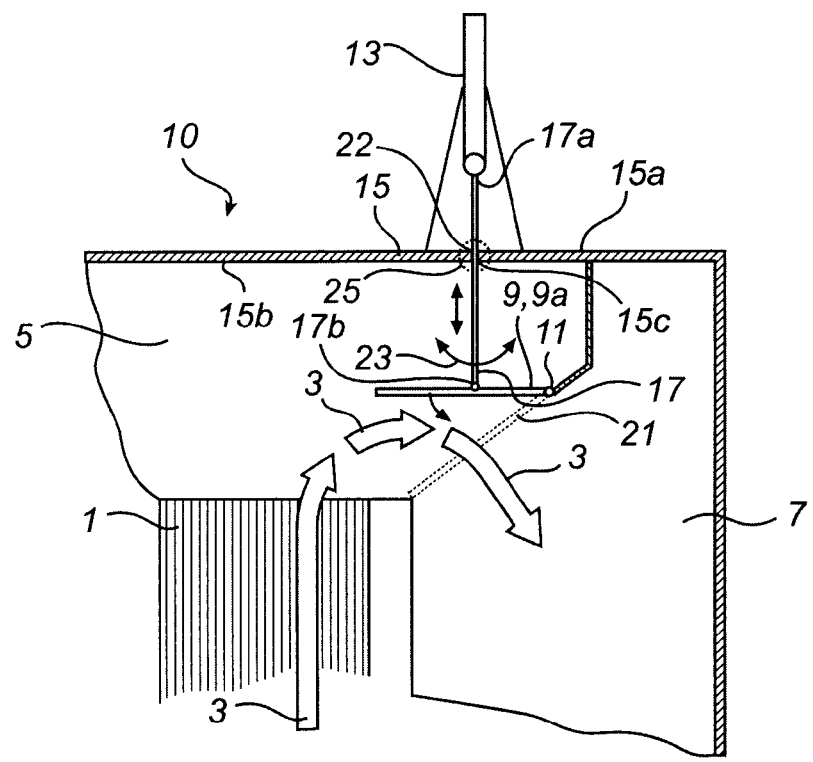
Fig. 1
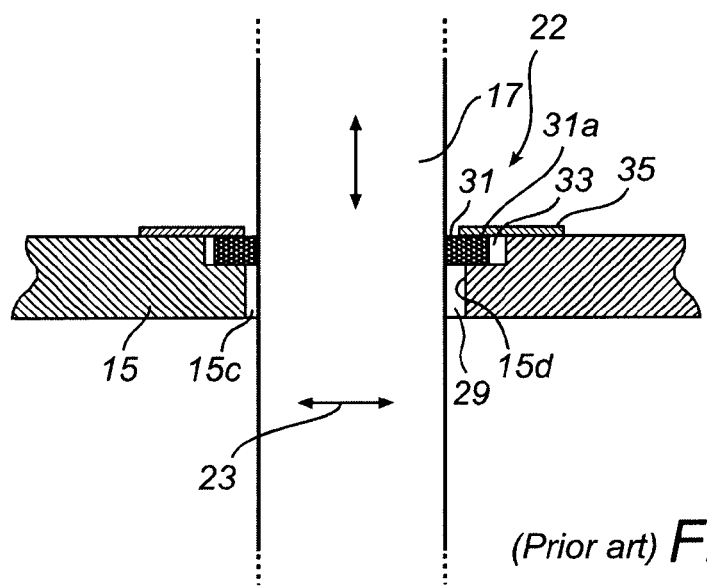
(Prior art) Fig. 2

SEALING DEVICE AND METHOD

This is a US National Phase application claiming priority to International Application No. PCT/IB2011/002030 having an International Filing Date of Sep. 1, 2011, incorporated herein in its entirety by reference.

TECHNICAL FIELD

The present disclosure relates to a sealing device, and corresponding methods, to prevent unwanted fluid flow through an aperture through which a control rod passes. More specifically, the control rod passes through an aperture in a wall for fixed connection between an actuator positioned on one side of the wall and a controlled entity positioned on an opposite side of the wall. As such, the actuator may be used to remotely control the controlled entity through linear, translational, gyrational or other such movement of the control rod. The subject sealing device that allows the control rod to pass through an aperture in the wall and move therein with respect to the wall without unwanted fluid flow includes a packing box sealed around the control rod and attached by means of a flexible member to the wall to prevent fluid flow. As such, the control rod extends through the packing box and a packing box seal around the control rod provides a fluid tight seal between the control rod and the packing box.

BACKGROUND

Sealing devices are typically used in applications, where there is a pressure difference on opposite sides of a wall, to reduce or eliminate an undesired gas flow through any apertures in the wall. One such application is in a fabric filter system, where the wall may delimit a filter plenary space. The filter plenary space contains hot, chemically aggressive gases at low pressure. If cold ambient air leaks into the filter plenary space, the interior gas temperature falls, possibly causing the interior gas to condense. Interior gas condensation is undesirable since often it tends to cause excessive corrosion. Therefore, seals or sealing devices used to prevent or reduce leakage of ambient air should be gastight. At the same time, the seal/sealing device may need to allow for a certain flexibility, since control of the controlled entity may require various movements of the control rod. Allowing for such movement makes sealing devices relatively complex and expensive, while compromising the sealing efficiency to some extent.

One option to solve this problem would be to make the control rod flexible or articulated to reduce or eliminate the need for sealing device flexibility. However, such a modification would render the control rod and the use of the control rod to control the controlled entity relatively more complex and costly.

SUMMARY

One object of the present disclosure is to provide a sealing device with improved sealing capability useful for applications where there is a pressure difference on opposite sides of a wall. This object is achieved by means of a sealing device that includes a packing box moveable in relation to the wall with a fluid tight seal around a control rod that extends through an aperture in the wall, and a flexible member integral to the packaging box gas tightly secured to the wall.

More specifically, the subject sealing device is for use to provide a gastight seal around a wall aperture and around a movable control rod that passes through the wall aperture. In the subject embodiment, opposite ends of the control rod are integrally formed with or joined to an actuator on one side of the wall, and a controlled entity on the other side of the wall. As such, the actuator may be used to control the controlled entity primarily through movement of the control rod. The sealing device is used to prevent unwanted fluid flow through the wall aperture and around the control rod. The sealing device includes a packing box sealed around the control rod to prevent fluid flow therearound. The packaging box is integrally formed with or gas tightly joined to a flexible member. The flexible member is gas tightly secured to the wall so as to prevent fluid flow between the flexible member and the wall. The flexible member of the subject sealing device allows a relatively great range of control rod movement within the wall aperture.

Using the subject sealing device, no control rod movement is required within the packaging box opening. All control rod movement occurs with respect to the wall aperture, with the sealing device flexible member allowing for a broad range of control rod movement. As such, the subject sealing device is a relatively simple, inexpensive configuration with excellent sealing capabilities.

The sealing device flexible member may be constructed of a pleated or flat material extending from, integrally formed with or formed around, the packing box. One end of the flexible member is gas tightly attached to the wall surrounding the wall aperture. The opposed end of the flexible member is gas tightly joined to or integrally formed with the packing box. The subject sealing device may be secured on the exterior surface (actuator side) of the wall or on the interior surface (controlled entity side) of the wall.

A further embodiment of the subject sealing device, is useful in a fabric filter system comprising a closed space defined by one or more walls. The sealing device may be configured as described above, wherein the controlled entity is a damper positioned inside the closed space controlled by an actuator positioned outside the closed space.

A method of using the subject sealing device for sealing a wall aperture through which a control rod passes attached to an actuator placed on one side of the wall and a controlled entity placed on the other side of the wall, such that the actuator can control the controlled entity through motion of the control rod is characterized in sealing the sealing device packing box around the control rod using a gastight seal and gas tightly securing a flexible member integrally formed with or gas tightly joined to the packaging box to the wall to allow linear, translational, gyrational or other such movement of the control rod to control a controlled entity while preventing fluid flow past the sealing device.

A method of using an actuator to control a controlled entity using a sealing device according to the present disclosure, with the sealing device sealing a wall aperture through which a control rod passes, to allow movement of the control rod attached to an actuator placed on one side of the wall and a controlled entity placed on the other side of the wall, such that the actuator can control the controlled entity with motion of the control rod, characterized in moving an actuator integrally formed with or joined to the control rod with a sealing device packing box gas tightly sealed therearound and a flexible member gastight with the packaging box gas tightly secured to the wall, for effective linear, translational, gyrational or other such movement of the control rod to control a controlled entity.

BRIEF DESCRIPTION OF THE DRAWINGS

FIG. 1 is a side partial cross sectional schematic view of a prior art fabric filter system.

FIG. 2 is a side cross sectional view of a prior art sealing device.

DETAILED DESCRIPTION

Figure 3:
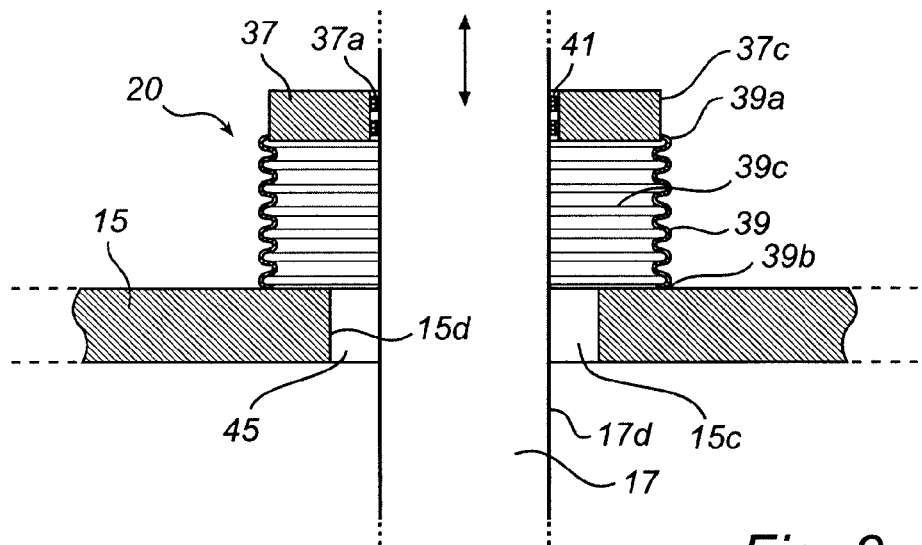
FIG. 3 is a side cross sectional view of a sealing device according to the present disclosure.

FIG. 1 is a schematic cross sectional view of a portion of a fabric filter system 10. The fabric filter system 10 comprises a filter section 1, typically in the form of filter bags, which separate particulate matter from a gas 3 flowing there through, which may typically be an exhaust gas from a coal combustion or waste incineration process. After passing through filter section 1, the gas 3 flows within plenary space 5 and on through outlet duct 7. A damper 9 in the form of a door hinged on a pivot 11 is used to control the amount of gas 3 that flows into outlet duct 7. This means that damper 9 may be used to shut down the flow of gas 3 through filter section 1, e.g., to allow maintenance work within fabric filter system 10. Gas 3 may thus alternatively be allowed to flow to other filter sections not shown in FIG. 1 for purposes of simplicity and clarity.

Damper 9 is controlled by an actuator 13. Actuator 13 is positioned outside beyond exterior surface 15a of wall 15. Interior surface 15b of wall 15 defines plenary space 5. Damper 9, positioned within plenary space 5 and used in accordance with the present description, constitutes a "controlled entity" 9a. Opposed ends 17a and 17b of control rod 17 attach to and between damper 9 and actuator 13 through wall aperture 15c. Movement of actuator 13 causes movement of attached opposed end 17a and hence translational movement of opposite end 17b of control rod 17 attached to damper 9. Such translational movement of opposite end 17b causes movement of damper 9 by a mainly linear motion of the control rod 17. For instance, as illustrated in FIG. 1, by pushing actuator 13 toward exterior surface 15a of wall 15, the actuator 13 movement is translated through control rod 17 to damper 9. Such movement causes damper 9 to swing around pivot 11 to a "closed" position 21 where the flow of gas 3 is blocked thereby, or "shut down". Sealing device 22 is used in region 25 surrounding aperture 15c through wall 15. Control rod 17 is positioned to extend through aperture 15c so as to have opposed end 17b within plenary space 5 and opposed end 17a outside plenary space 5 beyond exterior surface 15a of wall 15. The sealing device 22 allows linear movement of control rod 17 without compromising the sealing function of the sealing device 22.

FIG. 2 shows the above-described prior art sealing device 22 in greater detail. Sealing device 22 includes a recess 33 integrated around aperture 15c in wall 15. The sealing function of sealing device 22 is enabled through a sealing ring 31, e.g. made of silicon rubber. Sealing ring 31 is placed in recess 33 of wall 15 so that an extended edge 31a extends inwardly within aperture 15c beyond inner edge 15d of aperture 15c. Due to the resiliency of sealing ring 31, the same may be displaced further within recess 33 upon limited lateral movement of control rod 17 while maintaining a sealing function between the sealing ring 31 and the control rod 17. Such is illustrated in FIG. 2, where control rod 17 is slightly displaced to the left within aperture 15c, thereby similarly slightly displacing sealing ring 31 on the left further within recess 33 and on the right further beyond inner edge 15d. Sealing ring 31 is maintained in proper orientation within recess 33 by cover plate 35 which may be attached to wall 15 by means of screws (not shown).

Even though this prior art sealing device 22 allows some limited lateral movement 23 of control rod 17, such movement reduces sealing function efficiency. In the prior art sealing device illustrated in FIG. 2, there is a tradeoff between control rod 17 lateral movement and sealing ring 31 sealing function efficacy. Even if a spring (not shown) were to be added in recess 33 to fit the sealing ring 31 more firmly around control rod 17, and grease were to be added to fill recess 33, the same would be more complex and the sealing function would be less effective than that prior to the additions of a spring and grease.

FIG. 3 illustrates a sealing device 20 according to the present disclosure including a packing box 37 moveable in relation to wall 15. A flexible member 39 integrally formed with or gas tightly joined to packaging box 37 to surround a portion of control rod 17. If flexible member 39 is gas tightly joined to packaging box 37, one free end 39a is joined to exterior surface 37c of packing box 37 by means of an adhesive, attachment means or the like. An opposed free end 39b of flexible member 39 is gas tightly secured to wall 15 by means of an adhesive, attachment means or the like. Flexible member 39 thus prevents fluid flow or fluid leaks from occurring between wall 15 and packing box 37.

Control rod 17 extends through aperture 15c, interior 39c of flexible member 39 and packaging box 37 opening 37a. Within opening 37a is a gastight seal 41 that provides a seal around control rod 17. Movement of control rod 17 causes linear, translational, gyrational or other such movement of packaging box 37 gas tightly sealed by seal 41 around control rod 17. Virtually no movement of control rod 17 in relation to packing box 37 need take place for purposes of controlling the controlled entity. This means that packing box 37 may be provided with a relatively very firm seal 41 around control rod 17. Seal 41, in the form of one or more sealing rings, may provide a considerably higher degree of pressure on control rod 17, therefore providing a much more efficient sealing function over that of a lower pressure seal. Materials useful for seal 41, include for example VITON™ (trademark of DuPont Performance Elastomers L.L.C., Delaware, USA), and like materials suitable for the intended purpose and for use under the intended conditions.

Figure 4:
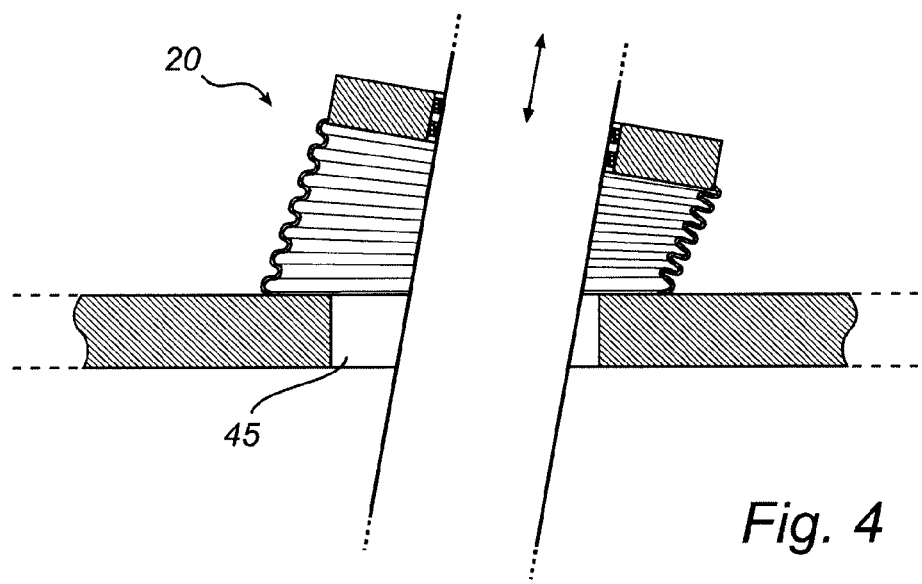
FIG. 4 is a side cross sectional view of the sealing device of FIG. 3 illustrating control rod movement.
Figure 5:
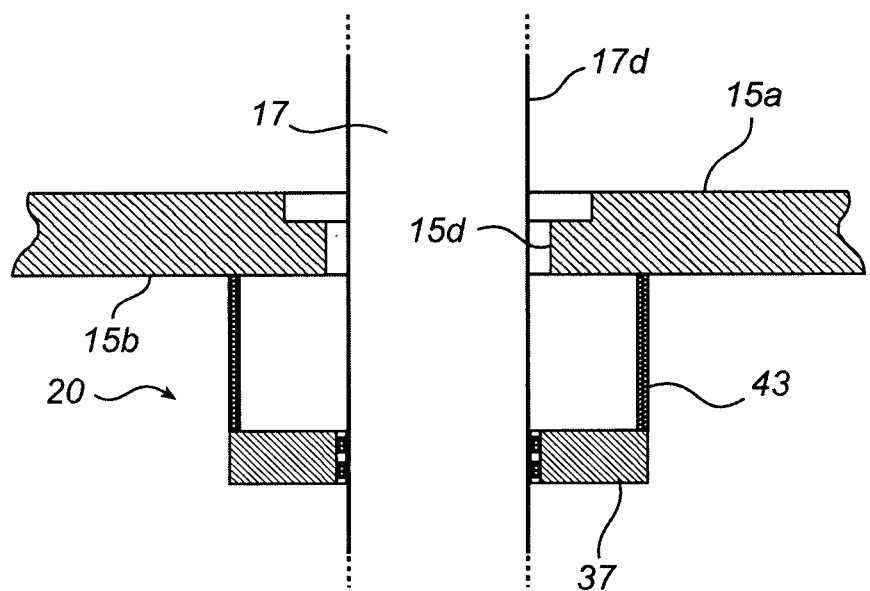
FIG. 5 is a side cross sectional view of a sealing device according to the present disclosure used in the application of the sealing device of FIG. 2.

Flexible member 39 may be formed of a pleated material as illustrated in FIG. 3 and FIG. 4, or formed of a flat material as illustrated in FIG. 5. As such, flexible member 39 may be constructed of any flexible material suitable for the intended purpose and intended conditions in terms of temperature resistance, chemical corrosion resistance for chemical(s) to which it may be exposed, structural integrity for withstanding differences in pressure, wear resistance, flexibility, and the like. Specifically, for use in connection with the fabric filter system application illustrated in FIG. 1, a flexible metal material, such as steel, or a steel reinforced material may be considered suitable for constructing flexible member 39. As will be illustrated in connection with FIG. 5, flexible member 39 may also be in the form of a rubber hose for less demanding applications. Other polymers, natural or synthetic rubbers and the like, optionally reinforced, may also be considered for some applications. Control rod 17 passes through aperture 15c sized to allow movement or "play" between inner edge 15d of aperture 15c and body 17d of control rod 17. Since no sealing function is needed between control rod 17 and aperture 15c, opening 15c may be sized as needed to allow for more movement of control rod 17, as is illustrated in FIG. 4.

FIG. 5 illustrates an embodiment of sealing device 20 used in a "retrofit application". The term "retrofit application", as used herein, means to use the sealing device 20 of the present disclosure in a fabric filter system or like system previously equipped with a prior art sealing device 22, such as that illustrated in FIG. 2. In such a retrofit application, the prior art aged, leaky or unsatisfactory sealing device 22 is rendered irrelevant by the installation of the subject sealing device 20. Moveable packing box 37 is gas tightly secured to the wall 15 by means of a flat flexible member 39, which may be in the form of a metal hose, a metal reinforced hose, a natural or synthetic hose or the like depending on the specific demands of the intended application. The prior art sealing ring 31 and cover plate 35 illustrated in FIG. 2 may be removed from around aperture 15c. As illustrated in FIG. 5, the packing box 37 may be positioned on either side of the wall 15, i.e., either on exterior surface 15a (actuator side) of wall 15 (not shown) or on interior surface 15b (controlled entity side) of the wall 15.

A method of using the subject sealing device 20 for sealing an aperture 15c through which a control rod 17 passes to be attached to an actuator 13 placed on one side of a wall 15 and a controlled entity 9a placed on the other side of the wall 15, such that the actuator 13 can control the controlled entity 9a with motion of the control rod 17 is characterized by sealing the sealing device 20 packing box 37 around the control rod 17 using a gastight seal 41 and gas tightly securing a flexible member 39 gas tightly joined to the packaging box 37 to the wall 15 to allow linear, translational, gyrational or other such movement of the control rod 17 to control a controlled entity 9a while preventing fluid flow past sealing device 20.

A method of using an actuator 13 to control a controlled entity 9a using a sealing device 20 according to the present disclosure, with the sealing device 20 sealing an aperture 15c through which a control rod 17 passes, to allow movement of the control rod 17 attached to actuator 13 placed on one side of the wall 15 and a controlled entity 9a placed on the other side of the wall 15, such that the actuator 13 can control the controlled entity 9a through motion of the control rod 17, characterized in moving an actuator 13 in communicating relation with a control rod 17 with a sealing device 20 packing box 37 gas tightly sealed therearound and a flexible member 39 gastight and integral with the packaging box 37 gas tightly secured to the wall 15, for effective linear, translational, gyrational or other such movement of the control rod 17 to control a controlled entity 9a.

The present disclosure is not limited to the above described examples and may be varied and altered in different ways within the scope of the appended claims. For instance, even if the control rod 17 is illustrated as a straight element, it may take alternative forms as desired for an intended purpose such as for example a curved, bent, helical or other such form.

The invention claimed is:

1. A sealing device for a control rod passing through an aperture in a wall comprising:
    the control rod attached between an actuator placed on one side of the wall and a controlled entity placed on the other side of the wall, such that the actuator can control the controlled entity with motion of the control rod,
    a packing box gas tightly sealed to the control rod with a seal, with the packing box and control rod moveable in relation to the wall; and
    a flexible member integral to the packing box gas tightly secured to the wall,
    wherein
    a play is provided between the aperture in the wall and the control rod, and
    the packing box includes an opening housing a firm gastight seal between the packing box and the control rod, the gastight seal having at least one sealing ring that provides a seal around the control rod.

2. A sealing device according to claim 1, wherein the flexible member is formed of a pleated material.

3. A sealing device according to claim 1, wherein the flexible member is formed of a flat material.

4. A sealing device according to claim 1, wherein the packing box is placed on an exterior surface of the wall.

5. A sealing device according to claim 1, wherein the packing box is placed on an interior surface of the wall.

6. A sealing device according to claim 1, wherein the aperture is sized for movement of the control rod therein.

7. A fabric filter system comprising:
    a closed space limited by a wall with a sealing device including a packing box gas tightly sealed with a seal to a control rod, with the packing box and control rod moveable in relation to the wall; and
    a flexible member integral to the packing box gas tightly secured to the wall enabling a controlled entity inside the closed space to be controlled by an actuator outside the closed space by the control rod therebetween,
    wherein
    a play is provided between the aperture in the wall and the control rod, and
    the packing box includes an opening housing a firm gastight seal between the packing box and the control rod, the gastight seal having at least one sealing ring that provides a seal around the control rod.

8. The fabric filter system according to claim 7, wherein the controlled entity is a damper.

* * * * *